United States Patent [19]

Courtois et al.

[11] 3,840,129

[45] Oct. 8, 1974

[54] STACKING SLED

[76] Inventors: Charles E. Courtois; Herbert O. Dippold, both of Rt. 3, Perryville, Mo. 63773

[22] Filed: Mar. 3, 1972

[21] Appl. No.: 231,614

[52] U.S. Cl. .................. 214/6 B, 56/361, 56/476, 214/505
[51] Int. Cl. .......................................... B65g 57/32
[58] Field of Search .......... 214/6 B, 501, 505, 77 P; 280/12 R, 24; 56/473.5, 474, 346, 475, 361, 476, 480

[56] References Cited
UNITED STATES PATENTS

| | | | |
|---|---|---|---|
| 2,648,945 | 8/1953 | Harrington | 56/473.5 X |
| 2,683,545 | 7/1954 | Wood | 214/77 P |
| 2,728,601 | 12/1955 | Quigley | 214/6 B |
| 2,828,600 | 4/1958 | Kormendy | 214/6 B |
| 2,833,109 | 5/1958 | Walker | 214/6 B |
| 3,080,071 | 3/1963 | Pratt et al. | 214/6 B |
| 3,189,387 | 6/1965 | Nieto | 214/6 B X |
| 3,367,518 | 2/1968 | Bishop | 214/6 B |

Primary Examiner—Robert J. Spar
Assistant Examiner—Leslie J. Paperner

[57] ABSTRACT

This stacking sled includes a chassis carrying a movable platform, and is provided with an elevation control assembly for raising and lowering the platform. The platform is mounted between chassis side frames by means of a transverse shaft having rearwardly projecting carrying arms supporting the platform. The elevation control assembly includes a bell crank arm for rotating the shaft to effectuate the raising and lowering of the platform, and the bell crank arm is controlled by an actuating assembly, which includes a toggle system, incorporating a tripping lever to precipitate the lowering of the platform. In the lowered position, the platform is held above the ground in a rearwardly sloping position to facilitate discharge of the hay bales. The sled includes a rear gate assembly, which is operated automatically to close when the platform is raised and open when the platform is lowered.

12 Claims, 6 Drawing Figures

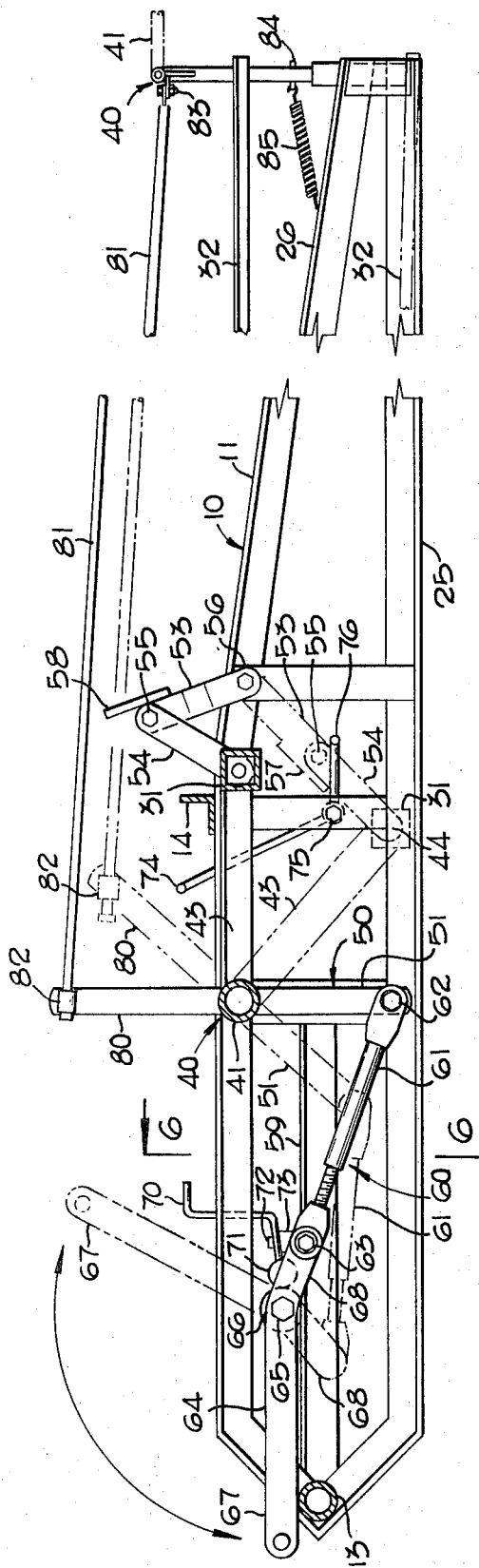
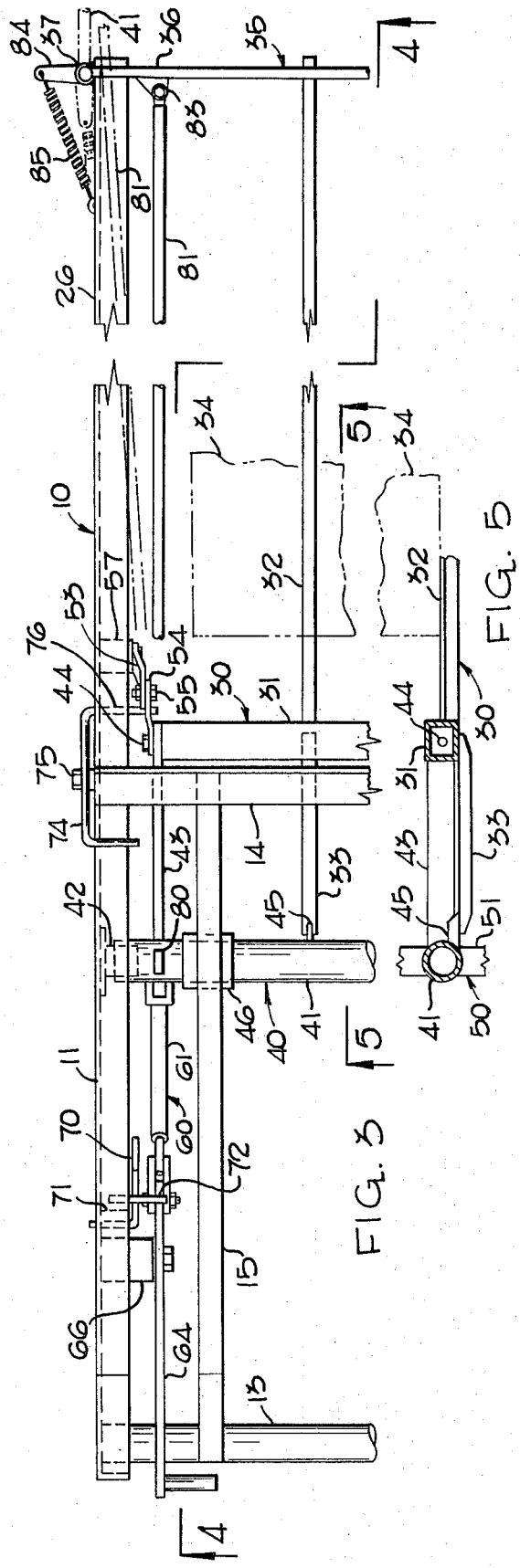
FIG. 4
FIG. 5

STACKING SLED

BACKGROUND OF THE INVENTION

This invention relates generally to a bale carrier and particularly to a sled for stacking hay bales for transportation.

Bale carriers fitted with skids, or runners, by which they are moved over the ground find particular use in the transportation of hay bales. Usually, such devices are provided with a platform on which the bales are stacked and include some means of preventing the bales from sliding off the platform rearwardly as the carrier is moved forwardly.

In order to provide maximum convenience in the discharge of the bales from the platform it is necessary that the platform be close to the ground during the discharge operation. This prerequisite has resulted in a number of carriers which are provided with a low level platform. Unfortunately, sled structures incorporating low level platforms tend to be difficult to move over rough and uneven terrain.

The necessity of providing some means of retaining the bales on the sled during transportation has been well recognized and carriers are known in the art which employ upwardly extending prongs for this purpose. At least two known carriers provide a rear gate assembly to retain the hay bales but, in each case, the latch-operated gate is hingedly suspended from a transverse cross bar and must be swung upwardly to open. The transverse cross bar presents a permanent obstruction across the discharge opening.

The present invention overcomes the deficiencies inherent in known bale carriers such as those discussed above.

SUMMARY OF THE INVENTION

This stacking sled provides a platform movable to a raised condition for transporting bales loaded thereupon and to a lowered condition for discharging bales therefrom. The platform is slightly inclined in the lowered position to facilitate discharge.

A spring-assisted elevation control assembly is provided by which the unloaded platform is raised manually. The loaded platform is lowered by actuating a simple tripping mechanism which utilizes the weight of the loaded platform in its operation.

The sled includes an outwardly-opening gate assembly which opens automatically when the platform is lowered and provides maximum clearance for discharge. The gate assembly closes automatically when the platform is raised.

The stacking sled includes a chassis having opposed side frames interconnected by transverse framing. A platform assembly, including a transverse support member, is mounted between the side frames by mounting means, which includes a transverse shaft member rotatively mounted between said frames. The shaft member is provided with a pair of rearwardly projecting carrying arms and the platform support member is pivotally connected to the remote ends of said arms.

The platform assembly includes a plurality of rearwardly extending stacking arms cantilevered from said support member and a plurality of forwardly extending bearing arms cantilevered from said support member and engageable with the shaft member to provide a couple resisting rotation of the platform assembly.

The platform assembly is raised and lowered by means of an elevation control assembly which includes a depending arm, fixedly attached to one end of the shaft member, and actuating means, connected to said depending arm in space relation from the shaft member to provide a bell crank means selectively rotating said shaft member to raise and lower said platform assembly.

A pair of opposed, inwardly closing gate members extending transversely of the side frames and hingedly connected thereto retain baled material on the stacking sled, and a gate control means is provided for operating said gate members. The gate control means includes a pair of substantially upright arms fixedly attached to each end of the shaft member and a pair of elongate tie bars extending between associated arms and gate members. The tie bars are pivotally connected to the upright arms, in spaced relation from the shaft member, and are pivotally connected to the gate members, in spaced relation from the hinge axis of said gate members whereby rotation of the transverse shaft operates said gate members.

The elevational control assembly actuating means includes a toggle linkage connected between the chassis and the arm depending from the shaft member and one of the toggle links is extended to provide a lever arm engageable with the chassis to control the disposition of said linkage. Said lever arm thereby limits rotation of the shaft member and controls the upper elevational limit of the platform assembly. A trip lever is provided to urge said toggle linkage out of dead center and thereby precipitate the lowering of the platform assembly. The elevational control assembly includes another toggle linkage connected between the chassis and one of the shaft member carrying arms. This toggle linkage is connected to the remote end of said carrying arm to limit rotation of the shaft member and thereby control the lower elevational limit of the platform assembly so that the stacking arms slope rearwardly in the lowered position to facilitate discharge of the bales. Interengageable stop means attached between the links hold said links in substantial alignment and a trip lever is provided selectively urging said toggle links out of alignment to permit the platform assembly to be raised.

The actuating means includes spring means operatively interconnected between the shaft member and the chassis urging said shaft member in a direction of rotation to raise the platform assembly and thereby assist the raising of said assembly.

The gate control means includes spring means connected between the gate members and the chassis urging the gate members into the open position.

BRIEF DESCRIPTION OF THE DRAWING

FIG. 3 is an enlarged fragmentary plan view illustrating the actuating mechanism;

FIG. 4 is a sectional view taken on line 4—4 of FIG. 3;

FIG. 5 is a sectional view taken on line 5—5 of FIG. 3, and

DESCRIPTION OF THE PREFERRED EMBODIMENT

Figure 1:
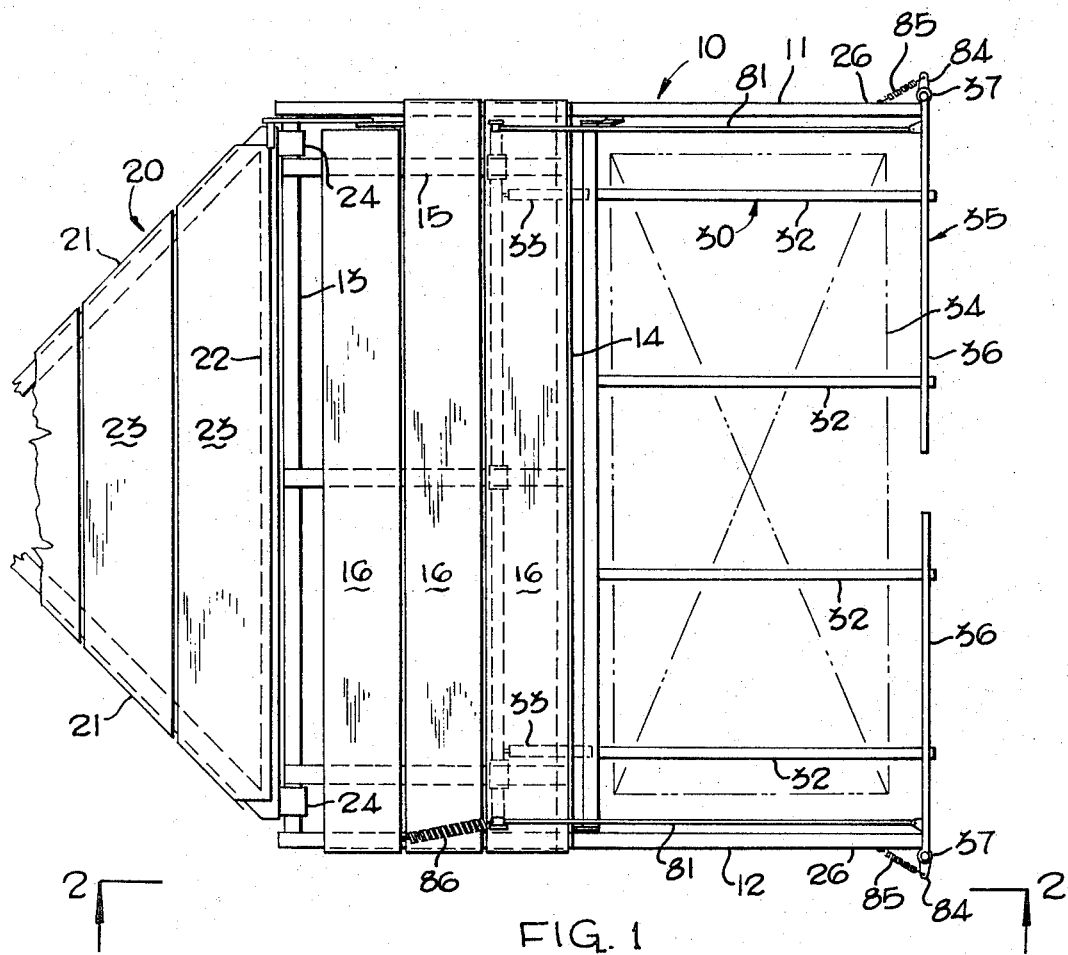
FIG. 1 is a plan view of the stacking sled.

Referring now by characters of reference to the drawings and first to FIG. 1 it will be understood that the stacking sled includes a chassis generally indicated by numeral 10 formed from opposed side frames 11 and 12 interconnected by transverse members 13 and 14 respectively and a plurality of stiffening members 15, extending between said transverse members 13 and 14. The chassis 10 is covered by boards generally indicated by numeral 16. A backboard frame 20, formed from inclined members 21 and transverse member 22 and covered by boards 23, is hingedly attached to the chassis transverse member 13 by means of collars 24, which are welded or otherwise attached to the backboard frame 20 and are disposed in embracing relation about the transverse member 13 of the chassis 10. The forward end of the backboard frame 20 is provided with a connection [not shown] suitable for hitching to a tractor or similar towing vehicle. Each side framing member includes upper and lower framing members 25 and 26 respectively extending the full length of the sled, the lower framing members 25 providing skids or runners.

A platform assembly, generally indicated by numeral 30, is mounted between the side frames 11 and 12 and may be raised or lowered relative to the chassis 10. The platform assembly 30 includes essentially a transverse member 31, constituting a support portion, a stacking portion provided by a plurality of stacking arms 32 cantilevered rearwardly of the support portion and welded or otherwise attached thereto, and a bearing portion provided by a pair of bearing arms 33 extending forwardly of the support portion. The bearing arms 33 engage another portion of the stacking sled, as will be described, to provide a couple balancing said stacking portion. The stacking arms 32 are of a size and spacing to receive baled hay indicated generally by numeral 34. A gate assembly, generally indicated by numeral 35, and including a pair of gate leaves 36, hingedly connected to associated side framing members 11 and 12 respectively at hinge points 37, retains the baled hay until such time as it is desired to remove said hay from the stacking sled.

The means by which the platform assembly 30 is mounted to the chassis 10, and the elevational control means controlling the raising and lowering of said platform assembly 30 and operating the gate assembly 35 are shown in FIGS. 3 and 4 with particularity and will now be described.

The platform assembly 30 is mounted to the chassis 10 by mounting means generally indicated by numeral 40 and including shaft means provided by an elongate tubular shaft 41 rotatively attached to the side frames 11 and 12 by means of pin elements 42, welded or otherwise attached to said side frames. The mounting means 40 also includes projecting carrying arms 43 disposed at each end of said shaft and constituting first arm means to which the platform assembly transverse support portion 31 is pivotally connected by means of bolts 44. Arcuate guard plates 46 attached to stiffening members 15 are compatibly configurated with shaft 41 and preclude interference between said shaft and said stiffening members.

The shaft 41 is held against rotation by means of an elevation control means generally indicated by numeral 50, which is provided at one side of the sled only in the preferred embodiment, adjacent side frame 11. The elevation control means includes a depending bell crank arm 51, welded or otherwise attached to said shaft 41, which provides a second arm means constituting a shaft rotating means. The elevation control means 50 also includes an actuating assembly generally indicated by numeral 60 which extends between the chassis 10 and the arm 51.

As shown in FIG. 5 the weight of the baled material 36 exerts a pressure on the stacking arms 32 and tends to rotate the platform assembly 30 about the pivot bolts 44. This tendency is resisted, when the stacking arms are in the horizontal support position, by the bearing arms 33 which engage projecting lugs 45, welded or otherwise attached to the tubular shaft 41. As will be clear from FIG. 4 the carrying arms 43, to which the platform assembly 30 is attached, and the depending arm 51 extending at right angles from the shaft 41 provide a bell crank structure. When the arm 51 is maintained in a vertical position, the arm 43 and the platform assembly 30 are maintained in a substantially horizontal position. The platform assembly 30 is lowered by permitting the shaft 41, and therefore carrying arm 43, to rotate. The position taken by the bell crank arms 43 and 51 and the platform assembly support member 33 when the shaft 41 is permitted to rotate in a clockwise direction is shown in phantom outline in FIG. 4. Because of the bearing engagement between the bearing arms 33 and the shaft lugs 45 the platform assembly as a whole rotates about the shaft 41 until the stacking arms 32 come into contact with the ground. When ground contact occurs the bearing arms 33, and therefore the platform assembly 30 are disengaged from the projecting lugs 45 which causes the platform assembly 30 to rotate in a counterclockwise direction momentarily. As shown in FIG. 4 the rotation of the shaft 41 is halted by means of a pair of suspension links, generally indicated by numerals 53 and 54, which are pivotally connected to each other by a pivot bolt 55 and constitute a first toggle linkage. Link 53 is pivotally connected to the side frame 11 by means of a pivot bolt 56, projecting from a bearing 57 welded or otherwise attached to the side frame 11, link 54 is pivotally connected to the end of the carrying arm 43 by pivot bolt 50. In order to preclude rotation of the suspension links beyond dead center link 53 is provided with a projecting bar 57 which overlaps and engages the link 54. In effect, the suspension links 53 and 54 provide a stop means limiting the rotation of the carrying arms 43 and defining the lower elevation of the platform support portion. The platform transverse member 31 is thereby suspended above the ground which precludes it from digging into the ground and importantly provides the stacking arms 32 with a rearwardly sloping disposition which facilitates discharge of the hay bales.

Figure 6:
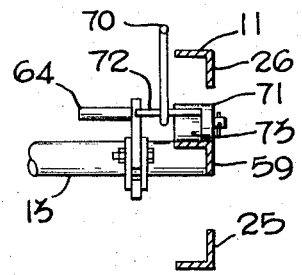
FIG. 6 is a sectional view taken on line 6—6 of FIG. 4.

The baled material 34 is placed on the platform assembly 30 when said platform assembly is in its substantially horizontal, elevated position and the elevated position is maintained by the actuating assembly 60. As clearly shown in FIG. 4, the actuating assembly 60 includes a toggle and lever system provided by a threadedly adjustable link 61 attached at one end by pivot bolt 62 to the depending bell crank arm 51, and at the other end to a cranked lever 64 by means of a pivot bolt 63. The cranked lever 64 is pivotally connected to the side frame 11 by means of a pivot bolt 65 projecting from a bearing 66 which is welded, or otherwise attached, to the horizontal framing member 58 of the side frame 11. The lever 64 includes a forwardly disposed actuating arm 67 and a rearwardly disposed toggle arm 68 providing a toggle link, which cooperates with the adjustable link 61 to constitute a second toggle linkage. The toggle arrangement is such that when the toggle links 61 and 68 are slightly over dead center the actuating lever engages the chassis transverse member 13, which provides a stop means. It will be understood that the application of a toggle breaking force in the vicinity of pivot bolt 53 will permit rotation of the shaft 41 and by virture of its weight the platform assembly 30 will descend rapidly into the lower position. In the preferred embodiment the toggle breaking mechanism is provided by means of a spring loaded, cranked handle 70, which is pivotally mounted at one end to a bearing 71 welded or otherwise attached to side framing member 59. As shown in FIG. 6, the cranked handle 70 includes a transverse lug 72 which is urged against the links 61 and 68 in the vicinity of the toggle center, represented by pivot bolt 63, when the handle 70 is depressed. A compression spring 73, seated on the side framing member 59, returns the handle to its original position. The position of the actuating assembly 60 following the breaking of the toggle and the subsequent rapid lowering of the platform assembly 30 is indicated in phantom outline in FIG. 4.

The platform assembly 30 is raised by rotating the actuating arm 67 in a counterclockwise direction from the position shown in phantom outline in FIG. 4. When suspension links 53 and 54 are aligned the carrying arm cannot be rotated. It is therefore necessary to provide some means of urging the links out of the toggle dead center position and this is achieved by means of a cranked lever 74 which is pivotally attached to the side frame 11 by means of pivot bolt 75. The crank arm 74 includes an outstanding leg 76, which extends across the suspension links in the vicinity of the pivot bolt 55 and by rotating the crank arm 74 in a counterclockwise direction the toggle is easily broken at which time it becomes a simple matter to rotate the actuating lever 67.

The gate assembly 35 is maintained in a closed position when the platform assembly 30 is in the raised position. In order to effectuate this the gate assembly 30 includes a pair of arms 80, fixedly attached to opposed ends of the shaft 41, and associated tie rods 81, which extend between said arms 80 and associated gate leaves 36, said rods 81 being pivotally connected to arms 80 by swivel connections 82 and to gate leaves 36 by pivotal connections 83. As shown in FIGS. 1 and 3 the tie rods 81 are connected to gate leaves 36 inboard of the hinge centers 37. The gate leaves 36 each include outwardly projecting lugs 84 and a pull is applied outboard of the gate leaves 36 by means of tension springs 85 which extend between said lugs 84 and the upper side framing member 26. When the arm 80 is maintained in the upright position by the actuating assembly the gate leaves 36 cannot be opened. However, when the shaft 41 is rotated to lower the platform assembly 30 the arm 80 is rotated in a clockwise direction and the tie rod 81 slides in the loose swivel connection 82 to permit the pull of the spring 85 to open the gate leaves 36.

Figure 2:
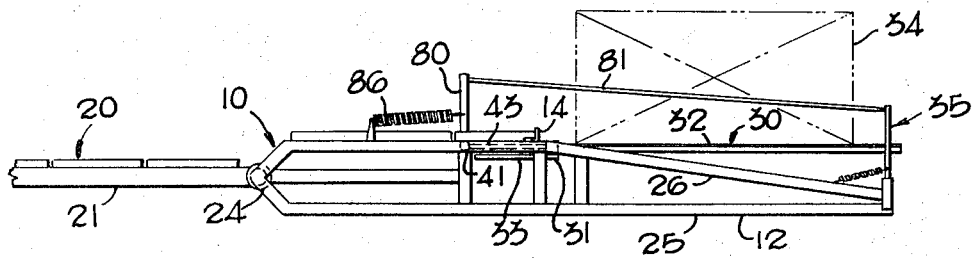
FIG. 2 is an elevational view taken on line 2—2 of FIG. 1.

As shown in FIG. 2 a spring 86 is connected between the side frame 12 and the associated arm 80 to assist in returning the platform assembly to the raised position and maintain said platform assembly in said position. The configuration of the lower arm 67 is such that toggle links 61 and 68 are at or slightly beyond dead center when said arm 67 engages the transverse member 13.

It will be understood that when the shaft 41 is rotated by the actuating mechanism, the gate assembly arms 80 are rotated in a counterclockwise direction and that this action exerts a pull on the gate leaves 36 to urge them into the closed position.

It is thought that the structural features and advantages of this stacking sled have become fully apparent from the foregoing description of parts but for completeness of disclosure the operation of the sled will be briefly summarized.

The stacking sled is intended for use in transporting baled hay and similar material and is provided with a movable platform assembly 30. When the platform assembly 30 is held in its raised position as shown in FIG. 2 the baled material 34 may be loaded upon the cantilever stacking arms 32. As shown in FIG. 5 the platform assembly 30 is pivotally mounted to the ends of a pair of carrying arms 43 which are fixedly attached to a rotatable shaft 41 which is pivotally mounted between the chassis side frames 11 and 12. The shaft 41 essentially forms the intermediate pivot of a bell crank assembly, consisting of arms 43 and 51, which is held against rotation by a lever and toggle linkage actuating mechanism generally indicated by numeral 60, as shown in FIG. 4. The platform assembly 30 is held in a horizontal position by means of forwardly projecting arms 33, which are engageable with the shaft lugs 45 to preclude relative rotation of support member 31. Thus, while the bell crank arms 43 and 51 are horizontally and vertically disposed respectively, the platform assembly 30 is held in a horizontal position. When the baled material 34 has been transported to a desired location the actuating mechanism which holds the platform assembly in its elevated position is tripped by depressing crank handle 70 to throw the toggle links 61 and 68 over dead center. When this occurs the restraining force applied to bell crank arm 51 is removed to permit the shaft 41 and carrying arms 43 to rotate in a clockwise direction. When the restraining force is removed the weight of the platform assembly 30 and the material stacked thereon causes said assembly to descent rapidly. The platform initially pivots clockwise about the shaft 41 until the stacking arms 32 strike the ground at which time the platform assembly pivots counterclockwise about the pivot bolt 44 until brought to rest by the suspension links 53 and 54, which have a combined length sufficient to hold the platform assembly support member 31 substantially in the position shown in FIG. 4 with the stacking arms sloped rearwardly.

As the shaft 41 rotates the two gate operating arms 80 also rotate to the position shown in phantom outline in FIG. 4 and the gate assembly 40 is opened automatically. Because the platform assembly 30 is substantially at ground level in the lowered position, with the stacking arms 32 slightly inclined and the gate assembly 40 in the open position the stacking sled may be drawn forward by the towing vehicle with the result that the baled material is left behind. When it is desired to raise the platform assembly 30 once again to receive a further load of baled material the cranked handle 74 is rotated in a counterclockwise direction to move the toggle links 53 and 54 out of alignment so that actuating lever 67 may be rotated with the assistance of the tension spring 86 until it engages the chassis transverse member 13, at which time the toggle links 60 and 68 effectively lock the actuating mechanism and maintain the platform assembly 30 in the raised position during the loading operation.

We claim as our invention:

1. In a stacking sled:
   a. chassis means including:
      1. opposed side framing means,
      2. transverse framing means interconnecting said side framing means,
   b. mounting means including:
      1. shaft means rotatively mounted to the chassis means, and
      2. first arm means fixedly attached to the shaft means and extending transversely of the axis of rotation of said shaft means,
   c. platform means disposed between the side framing means and carried by the mounting means and including:
      1. a support portion pivotally mounted to the first arm means,
      2. a stacking portion disposed rearwardly of the pivot center in cantilever relation, and
      3. a bearing portion disposed in space relation from the pivot center of the support portion and engageable with another portion of the sled to provide a couple balancing said stacking portion,
   d. elevation control means for the platform means including means rotating the shaft means and selectively elevating said platform means to a raised position,
   e. gate means, hingedly connected to the side framing means, extending transversely of said side framing means when the platform means is in the raised position, and
   f. gate control means, operatively interconnected to the shaft means, closing the gate means when the platform means is moved to the raised position,
   g. the shaft rotating means including:
      1. second arm means fixedly attached to the shaft means, and
      2. actuating means connected to said second arm means in spaced relation from the axis of rotation of said shaft means and rotating said second arm means, and
   h. the gate control means including:
      1. third arm means fixedly attached to the shaft means, and
      2. an elongate member pivotally connected to said arm means, in spaced relation from the axis of rotation of the shaft means, and pivotally connected to said gate means in spaced relation from the hinge axis.

2. In a stacking sled:
   a. chassis means including:
      1. opposed side framing means,
      2. transverse framing means interconnecting said side framing means,
   b. mounting means including:
      1. shaft means rotatively mounted to the chassis means, and
      2. first arm means fixedly attached to and rotatable with the shaft means and extending transversely of the axis of rotation of said shaft means,
   c. platform means disposed between the side framing means and carried by the mounting means and including:
      1. a support portion pivotally mounted to the first arm means and movable by said first arm means between a raised and lowered position,
      2. a stacking portion disposed rearwardly of the pivot center in cantilever relation, and
      3. a bearing portion disposed in spaced relation from the pivot center of the support portion and engageable with another portion of the sled to provide a couple balancing said stacking portion in said raised position and separable from said engageable portion in said lowered position,
   d. elevation control means for the platform means including means rotating the shaft means and first arm means and selectively elevating said platform means to said raised position,
   e. the shaft rotating means including:
      1. second arm means fixedly attached to the shaft means and rotatable therewith, and
      2. actuating means connected to said second arm means in spaced relation from the axis of rotation of said shaft means and rotating said second arm means,
   f. the bearing portion being disposed forwardly of the pivot center of the support portion, and
   g. the shaft means including stop means providing said other portion of the sled engageable by said bearing portion to provide the couple balancing the stacking portion and resisting rotation of the platform means about the pivot center in the raised position.

3. In a stacking sled:
   a. chassis means including:
      1. opposed side framing means,
      2. transverse framing means interconnecting said side framing means,
   b. mounting means including:
      1. shaft means rotatively mounted to the chassis means, and
      2. first arm means fixedly attached to the shaft means and extending transversely of the axis of rotation of said shaft means,
   c. platform means disposed between the side framing means and carried by the mounting means and including:
      1. a support portion pivotally mounted to the first arm means,
      2. a stacking portion disposed rearwardly of the pivot center in cantilever relation, and
      3. a bearing portion disposed in spaced relation from the pivot center of the support portion and engageable with another portion of the sled to provide a couple balancing said stacking portion,
   d. elevation control means for the platform means including means rotating the shaft means and selectively elevating said platform means to a raised position,
   e. the shaft rotating means including:
      1. second arm means fixedly attached to the shaft means, and 2. actuating means connected to said second arm means in spaced relation from the axis of rotation of said shaft means and rotating said second arm means, the actuating means including a toggle linkage between the chassis means and said second arm means, one of the links of said toggle linkage being extended to provide a lever arm controlling the disposition of said toggle linkage and limiting rotation of the shaft means when the platform means is in the raised position, f. the bearing portion being disposed forwardly of the pivot center of the support portion, and g. the shaft means including stop means engageable by said bearing portion and resisting rotation of the support member.

4. A stacking sled as defined in claim 3, in which:

h. the lever arm is engageable with the chassis means when said toggle linkage is substantially at dead center, and i. the elevation control means includes first trip means urging said toggle linkage out of dead center.

5. A stacking sled as defined in claim 4, in which:

j. one of the links of said toggle linkage is lengthwise adjustable.

6. In a stacking sled:

a. chassis means including:
1. opposed side framing means,
2. transverse framing means interconnecting said side framing means, b. mounting means including:
1. shaft means rotatively mounted to the chassis means, and
2. first arm means fixedly attached to the shaft means and extending transversely of the axis of rotation of said shaft means, c. platform means disposed between the side framing means and carried by the mounting means and including:
1. a support portion pivotally mounted to the first arm means,
2. a stacking portion disposed rearwardly of the pivot center in cantilever relation, and
3. a bearing portion disposed in spaced relation from the pivot center of the support portion and engageable with another portion of the sled to provide a couple balancing said stacking portion, d. elevation control means for the platform means including means rotating the shaft means and selectively elevating said platform means to a raised position and including a toggle linkage between the chassis means and said first arm means said toggle linkage limiting rotation of said shaft means to define the diposition of the platform means in the lowered position, e. the shaft rotating means including:
1. second arm means fixedly attached to the shaft means, and
2. actuating means connected to said second arm means in spaced relation from the axis of rotation of said shaft means and rotating said second arm means, f. the bearing portion being disposed forwardly of the pivot center of the support portion, and g. the shaft means including stop means engageable by said bearing portion and resisting rotation of the support member.

7. A stacking sled as defined in claim 6, in which:

h. stop means attached to one of the links of said toggle linkage and engageable by the other of said links holds said toggle links substantially in alignment, i. the elevational control means includes trip means urging said toggle links out of alignment.

8. In a stacking sled:

a. chassis means including:
1. opposed side framing means,
2. transverse framing means interconnecting said side framing means, b. mounting means including:
1. an elongate shaft member rotatively mounted to the chassis means,
2. opposed first arm members fixedly attached to each end of the shaft member and extending transversely of said member, c. platform means disposed between said side framing means and including:
1. a support member carried by said first arm members in spaced relation from said shaft member, 2. a plurality of stacking arms rearwardly extending in cantilever relation from said support member, 3. a plurality of bearing arms forwardly extending in cantilever relation from said support member and engageable with said shaft member to provide a couple resisting rotation of said support member, d. elevational control means for the platform means including:
1. a second arm fixedly attached to one end of the shaft member, and
2. actuating means connected to said second arm member in spaced relation from the shaft member for rotating said shaft member and selectively elevating said platform means to a raised position, e. opposed, inwardly closing gate members extending transversely of the side framing means and hingedly connected to associated side framing means, f. gate control means for operating the gate members, including:
1. opposed third arm members fixedly attached to each end of the shaft member, and
2. opposed elongate members pivotally connected between associated third arm members in spaced relation from the shaft member and pivotally connected to associated gate members in spaced relation from the hinge axis.

9. A stacking sled as defined in claim 8, in which:

g. the actuatng means includes a toggle linkage connected between the chassis means and said second arm member one of the links of said toggle linkage being extended to provide a lever arm controlling the disposition of said toggle linkage and limiting rotation of the shaft member when the platform means is in the raised position, the lever arm being engageable with the chassis means when the toggle linkage passes dead center, and i. the elevational control means includes trip means returning the toggle linkage over dead center.

10. A stacking sled as defined in claim 9, in which:

j. the elevation control means includes another toggle linkage connected between the chassis means and said first arm means said other toggle linkage limiting rotation of said shaft means to define the disposition of the platform means in the lowered position, k. stop means attached to one of the links of said other toggle linkage and engageable by the other of said links to hold the toggle links substantially in alignment, and l. the elevational control means includes trip means selectively urging said toggle links out of alignment.

11. A stacking sled as defined in claim 8, in which:

g. the gate control means includes spring means operatively connected between the gate members and the chassis means urging said gate members into the open position.

12. A stacking sled as defined in claim 8, in which:

g. the actuating means includes spring means operatively connected between the shaft member and the chassis means urging said shaft member in a direction to raise said platform means.

* * * * *